United States Patent Office 2,894,979
Patented July 14, 1959

2,894,979
STABILIZED POLYCARBOXYLIC ACID ESTERS

James M. Leach, Greensboro, N.C., assignor to Chas. Pfizer & Co., Inc., a corporation of Delaware No Drawing. Application August 21, 1957
Serial No. 679,524

21 Claims. (Cl. 260—475)

The present invention relates to new compositions of matter containing polyesters of polybasic acids with organic alcohols stabilized (a) to not only inhibit oxidative deterioration thereof, but of equal importance, also (b) to substantially prevent said polyester from corroding metals such as lead, copper, aluminum, iron, etc. The improved stability possessed by the stabilized esters of the present invention gives rise to greatly increased utility for these esters. Particularly increased utility is achieved when the stabilized esters of the invention are used as plasticizers for resins by incorporating the stabilized esters in the resin either as such or by the simultaneous addition to the resin of the ingredients comprising such stabilized esters. Further, I have discovered that the improved esters have marked utility as synthetic lubricants.

Accordingly, it is an object of the invention to provide new stabilized polyesters of polybasic acids with organic alcohols and to provide new compositions of matter containing these stabilized polyesters.

A further object of the invention is to provide new plasticized resins having improved initial color, increased resistance to discoloration upon subjection to heat and aging and increased specific electrical insulation resistance.

It is also an object of the invention to provide synthetic polyester lubricants having greatly reduced corrosive action upon metals.

Other and further objects of the invention will be apparent from the description of the invention which follows.

The problem of stabilizing polyesters is only partly satisfied by preventing oxidative deterioration of the ester. In other words, mere attempts to overcome or reduce oxidative influences is not enough to assure complete stabilization for commercial uses of the esters. Apparently, polyesters are subject to other injurious influences besides oxidative deterioration. Oxidative deterioration normally results in an increased neutralization number since the end products of the oxidation are frequently acidic bodies. These acids, as well as other products of oxidation, are of a corrosive and destructive nature. However, the incorporation of anti-oxidants which are effective to prevent rise in the neutralization number of a particular polyester do not prevent the ester itself from causing corrosion. For example, subjecting a lead test specimen to di-octyl sebacate of high quality at 325° F. with air blown through the ester for one hour yields approximately 200 mg. of corrosion. The incorporation of 0.5% by weight phenothiazine (the best anti-oxidant known for synthetic lubricants of this type as has been established by long service testing by the Armed Services Laboratories) reduces the corrosion caused by the same test to approximately 45 mg. which is an unacceptably high value for successful commercial utilization.

Repetition of the same test using the same polyester without phenothiazine or other additive while blowing nitrogen through the ester, so that any resulting corrosion could not be attributed to oxidation, results in the production of approximately 45 mg. of corroded metal.

In other words, the same reduction in corrosion is obtained when oxidation is prevented by the exclusion of oxygen as is obtained when oxidation is prevented by the utilization of an efficient anti-oxidant in the presence of air. The improved stabilized polyesters of the present invention are substantially non-corrosive to metals and when subjected to the lead corrosion test above referred to, do not cause any substantial corrosion (approximately 0 mg. of corroded metal).

I have discovered that the incorporation of a small quantity of at least one compound, e.g., selected from the group consisting of ascorbic acid, fatty acid derivatives of ascorbic acid and mixtures thereof, in a polyester of a polybasic acid with organic alcohols which has been treated to render it resistant to oxidative deterioration by use of anti-oxidants such as phenothiazine, will surprisingly provide such polyesters with such an improved stability as to render them substantially non-corrosive to heavy metals and provide them with increased utility, especially when the polyester is used as a synthetic lubricant or as a plasticizer for resins.

In addition to ascorbic acid and its fatty acid derivatives, there can also be used other compounds which have the right combination of redox and chelating properties. Among such compounds there may be mentioned kojic acid, 6-hydroxymethyl kojic acid, isoascorbic acid, esters of dicarboxy acetone, e.g., dimethyl acetone dicarboxylate, dibutyl acetone dicarboxylate, dihexyl acetone dicarboxylate and Terrein (2,3-dihydroxy-4-isopropenyl Δ⁴ cyclopentenone).

Any oil-soluble anti-oxidant may be employed to prevent oxidative deterioration of the polyester. Preferably, the anti-oxidant is a substituted phenolic compound. Representative substituted phenolic compounds which are useful in the present invention are alkyl diphenols having the formula:

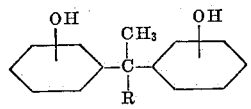

where R is an alkyl radical of 1 to 4 carbon atoms such as p,p' isopropylidene diphenol; 2:5 ditertiary butyl hydroquinone; substituted tertiary alkyl phenols such as 2:6 ditertiary butyl 4-methyl phenol and dimethyl 6-tertiary octyl phenol; and diphenols such as hydroquinone and naphthohydroquinone. Generally, alkylated mono-, di- and tri-hydric phenols and other substituted phenolic compounds and substituted and unsubstituted quinones and hydroquinones are known to possess utility as anti-oxidants. Other benzene derivatives may also serve as anti-oxidants, e.g., phenothiazine.

The polyesters to which the present invention is applicable are anhydrous polyesters of polybasic acids with organic alcohols and may be classified as either monomeric polyesters, polymeric polyesters and complex polyesters. Illustrative monomeric polyesters are alkyl esters with aromatic di-basic acids such as dimethyl, diethyl, dipropyl, dibutyl, diamyl, dihexyl, diheptyl, diisooctyl, dioctyl-2, di-2-ethyl hexyl, di-nonyl, di-decyl, octyl-decyl and butyl-decyl phthalates. Aromatic esters of aromatic dibasic acids may also be employed such as dibenzyl phthalate and butyl benzyl-phthalate. Cyclic esters are also included such as dicyclohexyl phthalate and other esters such as dicarbitol and dicellosolve phthalate may also be successfully stabilized by the present invention. Esters of aliphatic dibasic acids may also be treated in accordance with the invention. Alkyl adipates such as di-2-ethyl hexyl adipate and diisooctyl adipate may be employed. The esters of other aliphatic dibasic acids such as sebacates and azealates may also be employed. The dibasic acid may contain an ether linkage, e.g., diglycolates such as dioctyl-2-diglycolate and diisooctyl diglycolate. The present invention further encompasses polyesters formed from polybasic organic acids, triethyl, tributyl, acetyl tributyl, propionyl triethyl, tripropyl, propionyl tripropyl, trihexyl and trioctyl citrates being illustrative of esters formed from citric acid which is a hydroxy tribasic saturated acid. Esters of dibasic dihydroxy acids may also be employed such as dibutyl and dioctyl tartrate. The invention includes esters formed from polybasic acids with polyhydric alcohols as, for example, glycols, glycerols and pentaerythritol. The invention is not restricted to organic polyesters, but includes polyesters of inorganic tribasic acids such as phosphoric acid. Accordingly, triisooctyl phosphate, tri-2-ethyl hexyl phosphate, tributyl phosphate, tricarbitol phosphate and tricellosolve phosphate can be stabilized in accordance with the present invention. Aromatic phosphates such as tricresyl phosphate, triphenyl phosphate and tribenzyl phosphate may also be stabilized by the present invention. The phosphates to be stabilized include mixed alkyl aryl phosphates such as octyl phenyl, butyl benzyl, octyl benzyl and octyl-2 phenyl phosphates. Polymeric esters may also be stabilized by the present invention, illustrative polymeric esters being:

Propylene glycol sebacate polymer
Propylene glycol adipate polymer
Propylene glycol azealate polymer
Polypropylene glycol phthalate polymer
Polypropylene glycol maleate polymer The foregoing polymers contain two difunctional components, e.g., a dibasic acid and a glycol, and the mol ratio of these components may be greater than 1:1 to provide a resulting product containing a preponderance of either hydroxy or carboxy groups at the terminal positions of the polymer molecule. These terminal groups may be reacted with monofunctional organic compounds, e.g., monocarboxylic acids or monohydroxy alcohols to provide complex esters. Various complex esters may be stabilized by the present invention and illustrative complex esters are:

Bis (propylene glycol pelargonyl) sebacate
Bis (2-ethyl hexyl sebacyl) tetraethylene glycol
Bis (isooctyl adipyl) polypropylene glycol
Bis (octyl-2 diglycolyl) polyethylene glycol
Bis (octyl-2 diglycolyl) butylene glycol
Bis (benzyl diglycolyl) butylene glycol
Bis (butyl diglycolyl) octylene glycol
Bis (octyl-2 phthalyl) polyethylene glycol
Bis (isooctyl phthalyl) polyethylene glycol
Bis (isooctyl sebacyl) polypropylene glycol
Bis (isooctyl adipyl) polyethylene glycol
Bis (benzyl diglycolyl) butylene glycol
Bis (2-ethyl hexyl sebacyl) polyethylene glycol
Sebacic dipropylene glycol dipelargonate
Sebacic dipropylene glycol distearate
Adipic dipropylene glycol dioleate
Diglycolic dipolyethylene glycol dilaurate The foregoing polyesters are frequently employed in admixture with one another and the mixtures may also be stabilized by the present invention. For example, typical mixed lubricant compositions presented in parts by weight are:

50—di-2-ethyl hexyl sebacate
50—bis (isooctyl sebacyl) polypropylene glycol

25—diisooctyl adipate
75—bis (isooctyl adipyl) polyethylene glycol

5—tricresyl phosphate
20—di-2-ethyl hexyl sebacyl
75—bis (2-ethyl hexyl sebacyl) polyethylene glycol The utilization of many of the foregoing polyesters as plasticizers for resins is well known, and in this regard, dialkyl dicarboxylic acid ester plasticizers are quite common. It has generally been found desirable to incorporate substituted phenolic antioxidants in these polyester plasticizers and the addition of such anti-oxidants as, for example, p,p'-isopropylidene diphenol to the plasticizer has been found to impart very desirable properties to the plastic product with which the plasticizer is used. Unfortunately, sometimes the addition of substituted phenolic anti-oxidants to the plasticizer causes material discoloration of the plasticizer, which discoloration is imparted to the plastic in which the plasticizer is incorporated. While the plastic which contains the plasticizer including the substituted phenolic anti-oxidant remains resistant to further discoloration and breakdown upon aging, the plasticizer and the plastic possess an undesirable initial discoloration which makes them unacceptable in many instances to the trade which requires colorless plastics for many purposes, especially when the plastic is to be in sheet form.

According to the present invention, the discovery has been made that the addition of a small quantity of a compound such as ascorbic acid, fatty acid esters of ascorbic acid, as well as other compounds containing redox and chelating properties such as those mentioned above, and mixtures thereof to the plasticizer or to the plastic will prevent initial discoloration of the plasticizer and the plastic caused by the substituted phenolic anti-oxidant. Such addition does not, in any way, detract from the function of the anti-oxidant compound itself.

The further discovery was made that the initial color of the prepared plasticizer including the substituted phenolic anti-oxidant could be improved and that the heat stability and the resistance to heat aging and natural aging of the plastic containing such plasticizer could be also improved by the addition of minute quantities of these compounds, either alone or in admixture with one another.

An important utilization of plastic materials in recent years has been in connection with the coating of electric wire conductors as insulation therefor.

I have discovered that the addition of a small quantity of at least one compound selected from the group consisting of ascorbic acid, fatty acid esters of ascorbic acid and mixtures thereof to the plasticizing material, together with a substituted phenolic anti-oxidant or two or more substituted phenolic anti-oxidants, not only acts to impart to the plastic such properties as resistance to initial discoloration and discoloration upon application of heat and upon aging, but it was also found that the specific electrical insulation resistance of resinous material so prepared was increased to a surprising degree.

Illustrative examples of particular polyesters whose plasticizing utility has been greatly increased by the present invention are dioctyl phthalate, diisooctyl phthalate, dioctyl sebacate, diisooctyl adipate, dihexyl phthalate and dioctyl-2 sebacate.

Plasticizers of the type above specified may be used with and are soluble in polyvinyl chloride, polyvinyl acetate, polyvinyl copolymers, e.g., of the chloride and acetate, vinylidene chloride, alkyds, polystyrene, cellulose nitrate, cellulose acetate, ethyl cellulose, chlorinated rubbers and some of the natural gums. The aforementioned plasticizers have also been found to be compatible with the synthetic rubbers.

The electrical insulation properties of the plastic material may be accentuated by the use of at least two substituted phenolic anti-oxidants, e.g., a mixture of p,p' isopropylidene diphenol and hydroquinone together with at least one compound selected from the group consisting of ascorbic acid, fatty acid esters of ascorbic acid and mixtures thereof.

It has been found that the ascorbic acid, its fatty acid esters, as well as other compounds containing redox and chelating properties such as those mentioned above, and mixtures thereof may be used in the production of plasticized plastic materials without the addition of a substituted phenolic anti-oxidant, where the initial color and heat stability and retention of light transmission properties are of primary importance. It should be pointed out that the electrical insulation properties of a plastic film so prepared are not equivalent to that of a plastic wherein the substituted phenolic anti-oxidant or anti-oxidants are also employed.

It should be noted that the utilization of a substituted phenolic anti-oxidant, together with at least one compound selected from the group consisting of ascorbic acid, fatty acid esters of ascorbic acid and mixtures thereof to produce resistance to initial discoloration and improved specific insulation resistance in plastic materials cannot be attributed to any anti-oxidative capabilities of the added ingredients. Initial properties are manifested before there has been an opportunity for oxidation to take place. If, on the contrary, the difference in properties was manifested after a prolonged period of time, such differences might be attributable to the fact that the added ingredients prevented the peroxidic deterioration of the plastic.

The discovery that ascorbic acid is useful in stabilizing polyesters is surprising. Ascorbic acid has generally been considered to be insoluble in the usual polyesters employed as plasticizers and synthetic lubricants. Moreover, the fact that ascorbic acid in aqueous solution is known to be very sensitive to atmospheric oxygen and heat militates against its use in situations where stability against heat and atmospheric oxygen are primary requirements. In accordance with the present invention I discovered that relatively minute quantities of ascorbic acid and its fatty acid esters can be dispersed in polyesters or the plastic incorporating such polyesters as plasticizers without danger of separation, and that these minute quantities, which would normally be oxidized and destroyed almost immediately upon contact with atmospheric oxygen and/or, heat, are effective over a period of years to prevent initial discoloration of the plasticizer and the plastic incorporating such plasticizer, to materially reduce discoloration of the plastic product upon being subjected to heat and aging, and that the polyester itself is far less corrosive to metals even though subjected to high temperatures and oxygen.

According to the present invention, up to 2.0% by weight of polyester to be stabilized of substituted phenolic anti-oxidants may be employed. It is preferred to employ between .001 and 1% of these compounds. Up to 1.0% of ascorbic acid, fatty acid esters of ascorbic acid, as well as other compounds containing redox and chelating properties such as those mentioned above, and mixtures thereof may likewise be employed, the preferred proportion being about .002%.

According to the present invention, the substituted phenolic anti-oxidants and the ascorbic acid etc., can be added singly or in combinations directly to the polyester, as previously indicated, during its manufacture. Also, one or both of the additives may be incorporated on the mill to the mixture of plastic and plasticizer. It will accordingly be understood that the present invention is not limited to any particular time or point of addition of the ingredients to be added.

The stabilizers of the invention may be incorporated in the polyester by simple mixing. The polyester to be stabilized should be anhydrous and preferably contain no metallic salts, no free alkali and no free mineral acids. It is further preferable to incorporate the stabilizer into the polyester with the polyester in heated condition and in this regard a minimum temperature of about 100° C. provides best results. Ordinarily, temperatures about 125° C. are used commercially. Surprisingly, successful results are uniformly obtained at this high a temperature. After the materials are added to the heated esters, they are agitated thoroughly for about fifteen minutes and any excess undissolved stabilizer removed by filtration.

The following examples are given to illustrate the advantages of the present invention and to show the manner and mode of practicing the same. It is to be understood that the invention is not intended to be limited by the specific examples given.

Unless otherwise indicated, all proportions and percentages are by weight.

EXAMPLE I

Samples of a plastic material comprising a vinyl resin were tested to determine their heat and aging properties and their specific electrical insulation resistance. A sample of vinyl plastic plasticized with a conventional quantity of diisooctyl phthalate and which had added thereto 0.1% p,p' isopropylidene diphenol prior to being added to the vinyl resin was subjected to an accelerated heat aging test for: (1) 30 minutes at 175° C. and, (2) 75 minutes at 175° C. The color deterioration of the vinyl resin was slight compared with similar plastic not treated with the p,p' isopropylidene diphenol.

The specific electrical insulation resistance properties of this same plastic was tested at 60° F. and was found to be 13,900 megohms per 1,000 ft. of wire.

EXAMPLE II

A second sample of plasticized vinyl resin corresponding to the sample used in Example I wherein the plasticizer had been treated with 0.0625% p,p' isopropylidene diphenol, 0.05% hydroquinone and 0.02% of ascorbic acid was subjected to this same accelerated heat aging test and the resistance to heat aging was found to be improved. The specific electrical insulation resistance of this second plastic sample was found to be 45,400 megohms per 1,000 ft. of wire, indicating that the addition of ascorbic acid had greatly increased the specific insulating resistance properties of the vinyl resin.

EXAMPLE III

A pure plasticizing compound comprising diisooctyl sebacate was prepared in a conventional manner and a small quantity of p,p' isopropylidene diphenol on the order of 0.1% was added to the plasticizer compound. The plasticizer so prepared with the p,p' isopropylidene diphenol added was allowed to stand at room temperature, and one hour after preparation, the plasticizer was observed to have a very slight yellow cast. After standing for a day after preparation, the color of the normally colorless plasticizer was elevated 50 points (American Public Health Association Color Scale). The same plasticizer, under accelerated heat aging conditions (100° C.), was found to have an elevated color on the same scale of 500 points in thirty minutes, so as to completely destroy the usefulness of the compound as a plasticizer.

The color observed in Example III was controlled in the manner described in the following Example IV.

EXAMPLE IV

A pure plasticizing compound comprising diisooctyl phthalate was prepared in a conventional manner and 0.0625% p,p' isopropylidene diphenol was added as in the previous Example III and in addition .02% ascorbic acid was also added. The plasticizer so prepared was allowed to stand at room temperature for one hour and no discoloration of the plasticizer was noted. The plasticizer was then allowed to stand for one day, and again no appreciable discoloration was noted. This plasticizer was then stored for several months, and at the end of this time no appreciable discoloration was noted.

The heat acceleration test described in Example III still produced no appreciable color increase when following this Example IV.

EXAMPLE V

A pure plasticizing compound comprising diisooctyl phthalate was prepared in a conventional manner and 0.0625% p,p' isopropylidene diphenol was added to the plasticizing compound along with 0.002% of ascorbyl palmitate. The plasticizing material, after addition of the above additives, was allowed to stand for an indefinite period and no discoloration of the plasticizer was noted. A sample of the plasticizer prepared as above was subjected to an accelerated heat aging test and not over ten points of color increase (American Public Health Association Color Scale) was noted after treating the plasticizer at 100° C. for one hour.

EXAMPLE VI

In order to illustrate the startling effects achievable according to the discovery of the present invention, two plastic mills were set up to blend two batches of vinylidine chloride with plasticizers having neither a substituted phenolic anti-oxidant, such as p,p' isopropylidene diphenol, or ascorbic acid added thereto. The test was conducted at 340° F. Almost immediately a discoloration began to develop in the plasticizer-plastic mass. To one of the plastic mills a powdered mixture of p,p' isopropylidene diphenol and ascorbic acid in the preferred proportions was added to the plasticizer-plastic mass, and the plastic mass began improving in color immediately, while the plastic being treated by the other mill continued to develop a deeper color.

EXAMPLE VII

To further illustrate the beneficial results obtained from the preferred combination of stabilizers, two different batches of hexyl-decyl phthalate were tested for electrical properties, with and without the stabilizers. The incorporation of .10% p,p' isopropylidene diphenol and .02% ascorbic acid in each batch increased the volume resistivity of the hexyl-decyl phthalate from 1.81 x 10" ohm-cm. to 2.86 x 10" ohm-cm. in the first batch and from 1.63 x 10" ohm-cm. to 2.82 x 10" ohm-cm. in the second batch. The specific insulation resistance per 1,000 feet of wire at 75° F. was determined by measurement of the specific insulation resistance of the plastic slab. The plastic slab was formulated from 100 parts polyvinyl chloride (Geon 101), 50 parts plasticizer, 10 parts basic lead carbonate and 7 parts calcined clay. The results obtained were as follows: The first batch without any stabilizer showed a specific insulation resistance of 20,050 megohms per 1,000 feet of wire at 75° F., measured in the slab. Use of the stabilized first batch produced a specific insulation resistance of 45,020 megohms. The second batch without any stabilizer had a specific insulation resistance of 21,000 megohms. Use of the second stabilized batch increased the specific insulation resistance to 52,850 megohms.

EXAMPLE VIII

A series of tests were made upon standard quality di-2-ethyl hexyl sebacate to determine the value of various additives as corrosion inhibitors. For this purpose, the corrosive nature was measured by contacting the polyester with lead at 325° F. for one hour with air blowing through the sample. As can be seen from Table I presented below, the di-2-ethyl hexyl sebacate possessed a neutralization number of .122 before being subjected to the test. After being subjected to the lead corrosion test, the untreated sample produced 224.5 mg. of corroded lead and its neutralization number was increased to 2.11. Additional tests were then made employing various anti-oxidants alone, stabilizers of the present invention alone, and stabilizers of the present invention together with some of the known anti-oxidants. As is evident from Table I, only run 4 which employed a combination of an anti-oxidant, together with a stabilizer of the invention, produced satisfactory results.

*Table I*

[All tests used high quality di-2-ethyl hexyl sebacate.]

| | Additive | Pb Corrosion, mg. | Neut. No. | Appearance of Solution |
|---|---|---|---|---|
| 1 | None (Before testing) | | .122 | Clear. |
| | None | 244.5 | 2.11 | Cloudy precipitate present. |
| 2 | 0.50% Phenothiazine | 44.1 | .168 | Cloudy, dark precipitate present. |
| 3 | .02% Ascorbic Acid | 58.4 | 2.32 | Cloudy, white precipitate present. |
| 4 | .02% Ascorbic Acid, .10% P,P' Isopropylidene Diphenol. | .2 | .215 | Clear. |
| 5 | .10% Hydroquinone | 11.2 | | |
| 6 | .10% 2,6 Ditertiary Butyl 4-Methyl Phenol. | 62.1 | .150 | Clear. |
| 7 | .01% Ascorbyl Palmitate | 159.9 | 1.39 | Cloudy precipitate present. |
| 8 | .10% 2,5 Ditertiary Butyl Hydroquinone. | 146.4 | 1.38 | Do. |

EXAMPLE IX

Further tests of the same nature as were presented in Example VIII were conducted upon an inferior quality di-2-ethyl hexyl sebacate (prepared from recovered sebacic acid and recovered 2-ethyl-hexanol). The results of these tests are presented in Table II.

*Table II*

[All tests used inferior quality di-2-ethyl hexyl sebacate prepared from recovered sebacic acid and recovered 2-ethylhexanol.]

| | Additive | Pb Corrosion, mg. | Neut. No. | Appearance of Solution |
|---|---|---|---|---|
| 1 | None (Before test) | | .791 | |
| | None | 86.5–105.2 | 1.93 | Clear. |
| 2 | .50% Phenothiazine | 430.7 | 1.3 | Cloudy, dark precipitate present. |
| 3 | .10% P,P' Isopropylidene Diphenol, .50% Phenothiazine. | 393.6 / 400.9 (re-run) | 1.46 | Cloudy precipitate. |
| 4 | .02% Ascorbic Acid, .10% P,P' Isopropylidene Diphenol. | 1.1 | 1.40 | Clear. |
| 5 | .10% P,P' Isopropylidene Diphenol. | 306.6 | 1.21 | Cloudy-muddy color. |
| 6 | .02% Ascorbic Acid, .50% Phenothiazine. | .7 | 2.30 | Clear. |

As is evident, excellent results were produced only in runs 4 and 6, in both of which the same stabilizing mixture as in run 4 of Table I was employed, namely, the mixture of an anti-oxidant with a stabilizing agent of the invention.

EXAMPLE X

Still further tests of the same nature as presented in Example VIII were conducted upon dioctyl sebacate, diisooctyl adipate and diisooctyl phthalate to further illustrate the invention using monomeric esters. The results obtained are reported in Table III.

Table III

| Additives | Lead Corrosion, mg. | Neut. No. Before | Neut. No. After |
|---|---|---|---|
| 1.—Dioctyl Sebacate: | | | |
| A—None | 163 | .120 | 1.48 |
| B—.50% Phenothiazine | 6.4 | .112 | .114 |
| C—.02% Ascorbic Acid | 62.5 | .140 | 3.04 |
| D—.02% Ascorbic Acid, .10% P,P' Isopropylidene Diphenol | 1.4 | .146 | .221 |
| E—.02% Ascorbic Acid, .50% Phenothiazine | 0 | .153 | .157 |
| 2.—Diisooctyl Adipate: | | | |
| A—None | 117 | .113 | 1.87 |
| B—.50% Phenothiazine | 27.3 | .040 | .133 |
| C—.02% Ascorbic Acid | 192 | .133 | 3.38 |
| D—.02% Ascorbic Acid, .10% P,P' Isopropylidene Diphenol | .5 | .135 | .148 |
| E—.02% Ascorbic Acid, .50% Phenothiazine | 1.8 | .095 | .144 |
| 3.—Diisooctyl Phthalate: | | | |
| A—None | 47.4 | .038 | .163 |
| B—.50% Phenothiazine | 17.0 | .097 | .127 |
| C—.02% Ascorbic Acid | 85.5 | .117 | 1.40 |
| D—.02% Ascorbic Acid, .10% P,P' Isopropylidene Diphenol | 7.2 | .216 | .278 |

EXAMPLE XI

Additional tests as in Example VIII were performed upon bis-1,3(2-ethyl hexyl-n-octyl adipyl) butylene glycol and bis (2-ethyl hexyl sebacyl) tetraethylene glycol washed with Versene (the disodium salt of ethylene diamine tetra acetic acid) to illustrate the invention using complex esters and upon propylene glycol adipate polymer to illustrate the invention using a polymeric ester. The results obtained are reported in Table IV.

Table IV

| Additives | Lead Corrosion, mg. | Neut. No. Before | Neut. No. After |
|---|---|---|---|
| 1.—Bis-1,3(2-Ethyl Hexyl-n-Octyl Adipyl) Butylene Glycol: | | | |
| A—None | 65.1 | .132 | |
| B—.02% Ascorbic Acid | 24.3 | .175 | 1.81 |
| C—.02% Ascorbic Acid, .10% P,P' Isopropylidene Diphenol | 1.3 | .214 | .215 |
| 2.—Bis (2-Ethyl Hexyl Sebacyl) Tetraethylene Glycol (washed with Versene solution): | | | |
| A—None | 21.3 | .607 | .255 |
| B—.02% Ascorbic Acid | 38.5 | .322 | 2.55 |
| C—.10% P,P' Isopropylidene Diphenol | 20.6 | .320 | 1.04 |
| D—.02% Ascorbic Acid, .10% P,P' Isopropylidene Diphenol | 4.6 | .308 | .475 |
| 3.—Propylene Glycol Adipate Polymer: | | | |
| A—None | .9–3.2 | .846 | 1.23 |
| B—.50% Phenothiazine | 38.2–48.8 | .850 | 1.44 |
| C—.20% Ascorbyl Palmitate, .50% Phenothiazine | 0 | | |

EXAMPLE XII

Tests as in Example VIII were also performed upon a synthetic lubricant containing 75% dioctyl sebacate and 25% bis (2-ethyl hexyl azealyl) tetraethylene glycol to illustrate the invention using a mixed lubricant composition. The results of these tests are presented in Table V.

Table V

| Additives | Lead Corrosion, mg. | Neut. No. Before | Neut. No. After |
|---|---|---|---|
| 1. 75% Dioctyl Sebacate, 25% Bis (2-Ethyl Hexyl Azealyl) Tetraethylene Glycol | | | |
| A—None | 104 | .154 | 1.42 |
| B—.50% Phenothiazine | 7.1 | .151 | .165 |
| C—.02% Ascorbic Acid, 50% Phenothiazine | 1.8 | .168 | .212 |
| D—.10% Hydroquinone, .50% Phenothiazine | 8.0 | .329 | .270 |
| E—.02% Ascorbic Acid | 20.1 | .250 | 2.53 |
| F—.10% P,P' Isopropylidene Diphenol | 7.0 | .197 | .275 |
| G—.02% Ascorbic Acid, .10% P,P' Isopropylidene Diphenol | .5 | .340 | .516 |

EXAMPLE XIII

The lead corrosion tests of Example VIII were employed with trioctyl phosphate to illustrate the invention using a polyester of an inorganic polybasic acid. The results of these tests are presented in Table VI.

Table VI

| Additives | Lead Corrosion, mg. | Neut. No. Before | Neut. No. After |
|---|---|---|---|
| 1. Trioctyl Phosphate: | | | |
| A—None | 805.1 | .074 | 4.10 |
| B—.10% P,P' Isopropylidene Diphenol | 20.0 | .091 | .183 |
| C—.02% Ascorbic Acid | 788.1 | .220 | 8.32 |
| D—.50% Phenothiazine | 17.5 | .089 | .107 |
| E—.10% P,P' Isopropylidene Diphenol, .50% Phenothiazine | 18.5 | .088 | .124 |
| F—.02% Ascorbic Acid, .50% Phenothiazine | 10.7 | .193 | .241 |

EXAMPLE XIV

The lead corrosion tests described in Example VIII were extended to diisodecyl adipate and the corrosion tests were carried out for a more extended period of time up to 12 hours. The diisodecyl adipate employed had an acidity of 0.029% as acetic acid and a trace of alcohol was present. The results of these tests are presented in Table VII.

Table VII

| Additives | Lead Corrosion Per Square Inch, mg. | | |
|---|---|---|---|
| | 4 Hours | 8 Hours | 12 Hours |
| 1. Diisodecyl Adipate: | | | |
| A—None | 144 | 390 | |
| B—Ascorbic Acid | 3.7 | 7.0 | 162 |
| C—Ascorbic Acid (repeat) | 4.3 | 32.7 | 210 |
| D—Isoascorbic Acid | 0.2 | 0.5 | 2.5 |

In this example both ascorbic acid and isoascorbic acid were considerably superior to the blank with the isoascorbic acid showing the best result.

EXAMPLE XV

Another series of corrosion tests were made with a purer diisodecyl adipate than that utilized in Example XIV. The purer diisodecyl adipate had an acidity of 0.0054% as acetic acid and no alcohol was present. The results of these tests are presented in Table VIII.

Table VIII

| Additives | Lead Corrosion Per Square Inch, mg. | | |
|---|---|---|---|
| | 4 Hours | 8 Hours | 12 Hours |
| 1. Diisodecyl Adipate: | | | |
| A—None | 37.7 | 123 | 317 |
| B—Ascorbic Acid | 0.0 | 0.0 | 0.0 |
| C—Kojic Acid | 0.0 | 0.0 | 0.0 |
| D—6-Hydroxymethyl Kojic Acid | 0.0 | 0.0 | 0.0 |
| E—Terrein | 0.0 | 0.8 | 0.8 |
| F—Isoascorbic Acid | 1.6 | 2.3 | 2.3 |

The foregoing test results indicate that the utilization of an anti-oxidant alone or of a stabilizer of the present invention alone produces unpredictable results which are completely dependent upon the particular polyester being stabilized. The combination of an effective anti-oxidant with a stabilizing agent of the invention produces uniformly excellent results. It is believed that the corrosive tendency of a polyester towards a metal may be occasioned by a plurality of mechanisms and that it is presently impossible to predict which mechanism will be asserted in a particular instance. The utilization of the present invention permits the substantial elimination of the tendency of polyesters to be corrosive towards metals irrespective of the mechanisms by which such corrosion occurs. As previously indicated, it appears clear that at least some of these mechanisms are not oxidative in character.

This application is a continuation-in-part of my copending application Serial No. 256,620, filed November 15, 1951, now abandoned, and my copending application Serial No. 432,310, filed May 25, 1954, now abandoned.

I claim:

1. As a new composition of matter a dialkyl ester of a dicarboxylic acid selected from the group consisting of unsubstituted, saturated aliphatic dicarboxylic acids and phthalic acid together with at least one organic stabilizing compound selected from the group consisting of ascorbic acid and fatty acid esters of ascorbic acid, said stabilizing compound being present in a small amount between .0001 and 2% by weight of said dialkyl ester and including an anti-oxidant selected from the group consisting of phenol anti-oxidants and phenothiazine.

2. A composition according to claim 1 wherein said organic stabilizing compound is present in an amount between about .0001 to .02%.

3. A composition according to claim 1 wherein said anti-oxidant is a mixture including a small amount of p,p'-isopropylidene diphenol and hydroquinone.

4. A composition according to claim 1 wherein said anti-oxidant is a phenol anti-oxidant.

5. A composition according to claim 4 wherein the phenol anti-oxidant is α tocopherol.

6. A composition according to claim 1 wherein the anti-oxidant is p,p'-isopropylidene diphenol.

7. A composition according to claim 1 wherein the dialkyl ester is dioctyl sebacate.

8. A composition according to claim 1 wherein the dialkyl ester is diisooctyl phthalate.

9. A composition according to claim 1 wherein the dialkyl ester is dioctyl phthalate.

10. A composition according to claim 1 wherein the dialkyl ester is diisooctyl adipate.

11. A composition according to claim 1 wherein the dialkyl ester is dihexyl phthalate.

12. A composition according to claim 1 in which the organic stabilizing compound is ascorbic acid.

13. A composition according to claim 1 wherein said organic stabilizing compound is ascorbyl palmitate.

14. A composition according to claim 1 in which said dicarboxylic acid is sebacic acid.

15. A composition according to claim 1 including a small amount of p,p'-isopropylidene diphenol and from .0001 to .02% ascorbic acid.

16. A composition according to claim 1 wherein the ester is di-2-ethyl hexyl sebacate.

17. A composition according to claim 16 wherein said organic stabilizing compound is .0001 to 1% by weight of ascorbic acid.

18. A composition according to claim 1 wherein there is present a small amount of phenothiazine as said anti-oxidant.

19. A composition according to claim 18 wherein the stabilizing compound is ascorbic acid.

20. A composition according to claim 19 wherein the dialkyl ester is dioctyl sebacate.

21. A composition according to claim 18 in which said ester is diisooctyl phthalate.

References Cited in the file of this patent

UNITED STATES PATENTS

| | | |
|---|---|---|
| 2,333,655 | Mattill et al. | Nov. 9, 1943 |
| 2,417,281 | Wasson et al. | Mar. 11, 1947 |
| 2,440,383 | Riemenschneider et al. | Apr. 27, 1948 |
| 2,442,672 | Von Fuchs et al. | June 1, 1948 |
| 2,475,062 | Tawney | July 5, 1949 |
| 2,593,428 | Fischer et al. | Apr. 22, 1952 |